Nov. 9, 1954 J. A. BRUSTMAN 2,694,144

PULSE GENERATING AND MIXING CIRCUIT

Filed Nov. 6, 1950

INVENTOR.
JOSEPH A. BRUSTMAN
BY Ralph W. E. Bitner
ATTORNEY 2,694,144

PULSE GENERATING AND MIXING CIRCUIT

Joseph A. Brustman, Fairfield, Conn., assignor to Remington Rand Inc., New York, N. Y., a corporation of Delaware

Application November 6, 1950, Serial No. 194,225

1 Claim. (Cl. 250—27)

This invention relates to a pulse generating circuit, and has particular reference to a generator which delivers a pulse to a circuit carrying direct current.

The invention covers a circuit which permits the generation of a short pulse through a vacuum tube in considerable excess of the normal operating capacity of the tube and associated circuits. Circuits of this type have been used before, principally in radar applications, and have used current available from a fully charged capacitor to operate a high frequency oscillator. The present device is an improvement on prior art circuits in that it permits such a discharge pulse to be added to a circuit which is already producing a steady direct current. No additional power supply is necessary.

One of the objects of the invention is to produce an electric pulse of short duration of considerable magnitude for use in a load circuit.

Another object of the invention is to provide a circuit wherein a pulse of short duration may be added to a circuit in which a direct current is flowing.

Another object of the invention is to permit the use of a single power source to produce a steady state current and a short electric pulse.

Another object of the invention is to simplify a circuit arrangement whereby a small tube may produce a pulse of short duration considerably above and beyond its steady state ability.

The invention includes a power source of direct current, part of which is applied through a load circuit and an array of rectifiers to produce a steady direct current for use in the load circuit. It also includes an electron discharge device under control of an input circuit which is normally non-conducting, but which can be rendered conductive by the application of a positive pulse applied to the input circuit. A capacitor is connected in the anode circuit whereby it may be charged when the electron discharge device is non-conducting and will produce a pulse of high current value of short duration when the discharge device is rendered conductive.

For a better understanding of the present invention, together with other and further objects thereof, reference is made to the following description taken in connection with the accompanying drawings.

Figure 1:
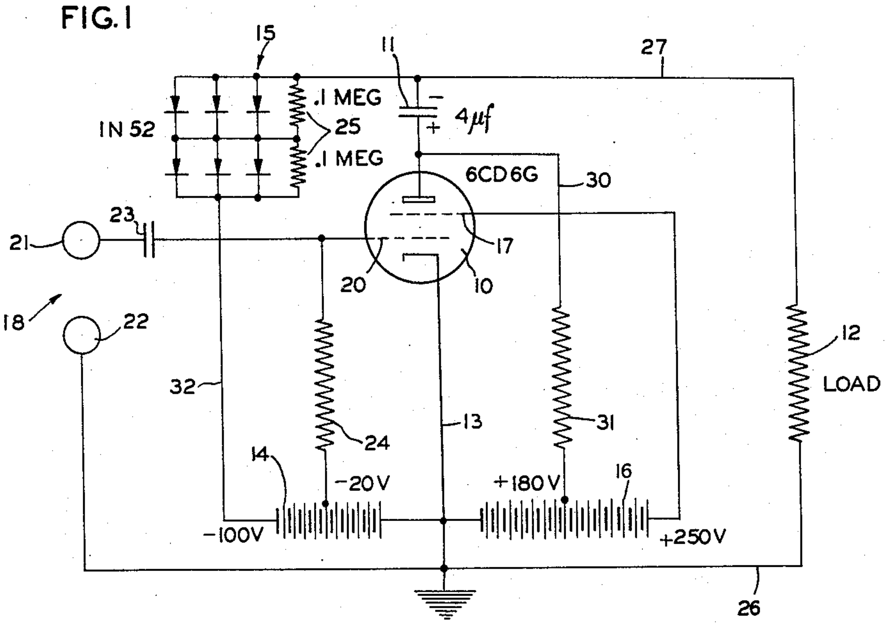
Fig. 1 is a schematic diagram of connections showing the pulse generating and mixing circuit.

Referring now to Fig. 1, a tetrode 10 or gate tube is used as the controlling device for the pulse formation. The anode circuit of this tube includes a capacitor 11 and a load 12 which uses the pulse and the bias current. For the purpose of providing a direct unvarying circuit through the load 12, a power source 14 and a rectifier array 15 are provided. A second power supply 16 provides an anode potential for the tube 10 and also proper voltage for the screen electrode 17. An input circuit 18 is used for the application of a control pulse to a control electrode 20 and includes terminals 21 and 22, a blocking capacitor 23, and a biasing resistor 14. The rectifier array 15 may consist of a single rectifier provided it has the proper current carrying characteristics. The circuit in Fig. 1 shows six rectifiers paralleled by two resistors 25, used in this case in order to provide the necessary current and voltage characteristics demanded by the circuit operation. The series of graphs in Fig. 2 indicate the characteristics during operation of the device and will be explained hereinafter.

When the circuit is in its normal or quiescent state, a direct current supply circuit may be traced from the ground point or the negative terminal of power supply 14, over conductor 26, through the load 12, over conductor 27, through the rectifier array 15, and back to the negative terminal of power supply. This current is required by the load at all times, and has been used during the operation of this circuit to provide a negative bias for a large number of trigger stages in the circuit of an electronic calculator. Part of the power supply 14 is employed to furnish a negative bias for the control electrode of the gate tube 10 so that during the normal operation of the circuit the tube is non-conducting and no current flows between the anode and the cathode. A circuit may also be traced from one side of the capacitor 11, over conductor 30, through an anode resistor 31, to part of the power supply 16, thence through the entire power supply 14, over conductor 32, through the rectifier array 15, and back to the other side of capacitor 11. As indicated by the voltage values in Fig. 1, the capacitor 11 will thereby be charged to a total of 280 volts. The steady state current through the load 12 is indicated in Fig. 2 by a horizontal line drawn a constant distance from the zero or reference line.

Figure 2:
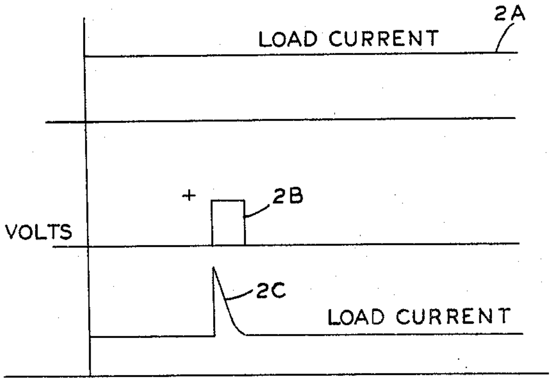
Fig. 2 is a graph showing voltage and current in the circuit plotted with respect to time.

If now it is desired to produce a large pulse of short duration and apply it to the load without disturbing or cutting off the steady state current, a positive pulse is applied to the input circuit 18, the shape of such a voltage pulse being indicated by graph 2B in Fig. 2. The applied pulse passes through capacitor 23 and is applied between the cathode and the control electrode 20, thereby raising the potential to a voltage value which makes the tube 10 conducting. As soon as the tube reaches a conducting condition, a capacitor 11 discharges through a circuit which may be traced from the positive side of the capacitor, through the tube 10, over conductors 13 and 26, through the load 12, and back over conductor 27 to the other side of the capacitor. The discharge from the capacitor is blocked from the power supply 14 because of the rectifier array 15. The resulting load current is shown in Fig. 2 in graph 2C and indicates the current through the load due to the mixture of the steady state current and the applied pulse. Such a pulse has been used to actuate a large number of trigger circuits employed in an electronic computer.

The following circuit constants may be used in the circuit shown in Fig. 1, and are illustrative of the specific application of the invention:

| | |
|---|---|
| Tube **10** | 6CD6G. |
| Capacitor **11** | 4 microfarads. |
| Resistor **24** | 100,000 ohms. |
| Resistor **31** | 1,000 ohms. |
| Power supply **16** | 180 and 250 volts. |
| Power supply **14** | 100 and 20 volts. |
| Rectifiers | 1N52. |
| Resistor **25** | 100,000 ohms. |

Using this circuit, a steady state current up to 300 milliamperes is available at 100 volts, and an electric pulse of 200 volts with a capacity of 600 mils is available. The maximum rated current capacity of the above tube is approximately 170 milliamperes.

While there have been described and illustrated specific embodiments of the invention, it will be obvious that various changes and modifications may be made therein without departing from the field of the invention, which should be limited only by the scope of the appended claim.

What is claimed is:

In combination, a source of electric energy having end and intermediate connections, a resistance and a unilateral conductor connected in series between one of said end connections and an intermediate connection to said source, an ionizing electric valve having a cathode, a control electrode and an anode, a capacitor connecting said anode with the resistor end of said unilateral conductor, an impedance connecting said anode with the other of said end connections, connection between said cathode and said intermediate source connection, and means for applying signals to said control electrode.

(References on following page)

References Cited in the file of this patent

UNITED STATES PATENTS

| Number | Name | Date |
|---|---|---|
| 2,063,025 | Blumlein | Dec. 8, 1936 |
| 2,412,542 | Smith | Dec. 10, 1946 |
| 2,442,304 | Mayle | May 25, 1948 |
| 2,442,305 | Mayle | May 25, 1948 |